(12) United States Patent
Zhang et al.

(10) Patent No.: US 12,351,061 B2
(45) Date of Patent: Jul. 8, 2025

(54) MOUNTING PLATFORM, BATTERY REPLACEMENT DEVICE AND CONTROL METHOD THEREOF

(71) Applicant: AULTON NEW ENERGY AUTOMOTIVE TECHNOLOGY GROUP, Shanghai (CN)

(72) Inventors: Jianping Zhang, Shanghai (CN); Chunhua Huang, Shanghai (CN)

(73) Assignee: AULTON NEW ENERGY AUTOMOTIVE TECHNOLOGY GROUP, Shanghai (CN)

( * ) Notice: Subject to any disclaimer, the term of this patent is extended or adjusted under 35 U.S.C. 154(b) by 769 days.

(21) Appl. No.: 17/600,369

(22) PCT Filed: Apr. 3, 2020

(86) PCT No.: PCT/CN2020/083249
§ 371 (c)(1),
(2) Date: Sep. 30, 2021

(87) PCT Pub. No.: WO2020/200313
PCT Pub. Date: Oct. 8, 2020

(65) Prior Publication Data
US 2022/0153238 A1 May 19, 2022

(30) Foreign Application Priority Data
Apr. 3, 2019 (CN) .......................... 201910264544.1
Apr. 3, 2019 (CN) .......................... 201910264615.8

(51) Int. Cl.
B60L 53/80 (2019.01)
B60K 1/04 (2019.01)
(Continued)

(52) U.S. Cl.
CPC ................. B60L 53/80 (2019.02); B60S 5/06 (2013.01); B66F 9/0754 (2013.01); B60K 2001/0461 (2013.01)

(58) Field of Classification Search
CPC .... B60K 2001/0461; B60K 2001/0494; B60L 53/80; B60S 5/06; B66F 9/0754
See application file for complete search history.

(56) References Cited

U.S. PATENT DOCUMENTS 4,808,058 A * 2/1989 Carney .................... B60K 1/04
414/349
7,175,379 B2 * 2/2007 Sellhorn ................. B60L 53/80
414/607
(Continued)

FOREIGN PATENT DOCUMENTS

AU 2014202307 A1 11/2014
CN 102202944 A 9/2011
(Continued)

OTHER PUBLICATIONS

Jan. 27, 2024 Second Office Action issued in Chinese Priority Application No. 201910264615.8.
(Continued)

Primary Examiner — James Keenan

(57) ABSTRACT

Disclosed is a mounting platform, comprising: a tray and a fixed plate, the tray is used for carrying a battery, and the tray is provided on the fixed plate and can move horizontally in a first direction relative to the fixed plate; a first guide fork is provided on one side of the fixed plate and the first guide fork can move horizontally in a second direction perpendicular to the first direction; a second guide fork is provided on one side of the tray, and the second guide fork can move horizontally in the second direction. Further provided is a control method, which is used for controlling the mounting platform above. The mounting platform can fit various (Continued)

models of vehicle batteries by providing the first guide fork and the second guide fork which can move in the second direction, thereby achieving universality of a battery replacement station.

7 Claims, 6 Drawing Sheets

(51) Int. Cl.
   *B60S 5/06*   (2019.01)
   *B66F 9/075*  (2006.01)

(56) References Cited

U.S. PATENT DOCUMENTS

| | | | | |
|---|---|---|---|---|
| 8,167,069 | B2 * | 5/2012 | Boegelein | B60L 53/80 |
| | | | | 429/96 |
| 11,235,680 | B2 * | 2/2022 | Zhang | B66F 9/07504 |
| 2011/0303509 | A1 | 12/2011 | Agassi et al. | |
| 2015/0151723 | A1 | 6/2015 | Yang et al. | |
| 2017/0297541 | A1 | 10/2017 | Droste | |

FOREIGN PATENT DOCUMENTS

| | | | | | |
|---|---|---|---|---|---|
| CN | 202046299 | U | | 11/2011 | |
| CN | 102729960 | A | | 10/2012 | |
| CN | 102765373 | A | | 11/2012 | |
| CN | 103935335 | A | | 7/2014 | |
| CN | 105480209 | A | | 4/2016 | |
| CN | 105799661 | A | * | 7/2016 | ............ B60S 5/06 |
| CN | 106740725 | A | | 5/2017 | |
| CN | 107458351 | A | * | 12/2017 | ............ B60S 5/06 |
| CN | 108146405 | A | | 6/2018 | |
| CN | 207481876 | U | | 6/2018 | |
| CN | 207594923 | U | | 7/2018 | |
| CN | 207697714 | U | | 8/2018 | |
| CN | 109411662 | A | | 3/2019 | |
| CN | 109501774 | A | | 3/2019 | |
| CN | 109532778 | A | | 3/2019 | |
| CN | 208646814 | U | | 3/2019 | |
| CN | 210027366 | U | | 2/2020 | |
| CN | 210062942 | U | | 2/2020 | |
| EP | 2679436 | A1 | | 1/2014 | |
| GB | 2050310 | A | * | 1/1981 | ............ B60K 1/04 |
| JP | 2011042309 | A | | 3/2011 | |
| JP | 2011518710 | A | | 6/2011 | |
| JP | 2012040935 | A | | 3/2012 | |
| WO | 2010033883 | A1 | | 3/2010 | |
| WO | 2013144948 | A1 | | 10/2013 | |
| WO | WO-2013144953 | A1 | * | 10/2013 | ......... B60L 11/1822 |

OTHER PUBLICATIONS

Jan. 24, 2024 Supplementary Search Report issued in Chinese Priority Application No. 201910264615.8.
Mar. 24, 2023 The Extended European Search Report issued in European Patent Application No. 20784249.3.
Jul. 9, 2020 International Search Report issued in International Patent Application No. PCT/CN2020/083249.
Jul. 9, 2020 Written Opinion of the International Searching Authority issued in International Patent Application No. PCT/CN2020/083249.
Aug. 15, 2023 First Office Action issued in Singaporean Patent Application No. 11202110902R.
Sep. 22, 2023 First Office Action issued in Chinese Patent Application No. 201910264544.1.
Oct. 3, 2023 Notice of Reasons for Refusal issued in Japanese Patent Application No. 2021-558697.
Aug. 30, 2023 First Office Action issued in Chinese Patent Application No. 201910264615.8.
Sep. 19, 2023 Search Report issued in Chinese Patent Application No. 201910264544.1.
Aug. 24, 2023 Search Report issued in Chinese Patent Application No. 201910264615.8.
Jul. 2, 2024 Second Office Action issued in Japanese Patent Application No. 2021-558697.

* cited by examiner

MOUNTING PLATFORM, BATTERY REPLACEMENT DEVICE AND CONTROL METHOD THEREOF

This application requires the priority of Chinese patent applications 201910264615.8 and 201910264544.1 filed on Apr. 3, 2019. This application refers to the full text of the aforementioned Chinese patent applications.

TECHNICAL FIELD

The present disclosure relates to the field of quick change electric vehicles, in particular to a mounting platform, battery replacement device and control method thereof.

BACKGROUND

In view of the existing power exchange technology, it is difficult for different models of vehicles to share the battery replacement station for battery replacement, because different models use different battery packs, the type of battery replacement device in the battery replacement station are unified. It can not adapt to all battery packs, so the battery replacement mode will be difficult to popularize. Replacing different types of battery packs between different models of vehicles, for battery replacement station, is difficult to locate the position between different models of vehicles and battery replacement device. Because even for a unified car, the positioning accuracy between it and the battery replacement device will be affected by many factors. For example, the dimensional consistency of each vehicle itself, tire pressure and other factors will affect the positioning of the vehicle, let alone between different models of vehicles.

Content of the Present Invention

The technical problem to be solved in the present disclosure is to overcome the defect that the battery replacement station of prior art is difficult to locate the position between different models of vehicles and battery replacement device, provide a mounting platform, battery replacement device and control method thereof method thereof.

The present disclosure solves the above-mentioned technical problems through the following technical solutions:

A mounting platform comprising: a tray and a base plate; the tray is used for carrying a battery, and the tray is provided on the base plate and can move horizontally in a first direction relative to the base plate; a first guide fork is provided on one side of the base plate, and the first guide fork can move horizontally in a second direction perpendicular to the first direction; a second guide fork is provided on one side of the tray, and the second guide fork can move horizontally in the second direction.

A mounting platform comprising: a tray and a base plate; the tray is used for carrying a battery; the tray is provided on the base plate and can move horizontally in a first direction relative to the base plate; a first guide fork is provided on one side of the base plate, and the first guide fork can move horizontally in a second direction perpendicular to the first direction relative to the base plate; the tray comprises a carrying layer and a connection layer, the connection layer is provided on the base plate and can move horizontally relative to the base plate, the carrying layer is detachably provided above the connection layer and a third guide fork is provided on the carrying layer.

The positive progressive effects of the present disclosure are as follows: the mounting platform and the battery replacement device that contains the mounting platform can fit various models of vehicle batteries by providing the first guide fork and the second guide fork which can move in the second direction, thereby achieving universality of a battery replacement station. The control method can achieve replacing different types of battery packs between different models of vehicles by the same battery replacement device.

REFERENCE NUMBERS

Embodiment 1

Figure 1:
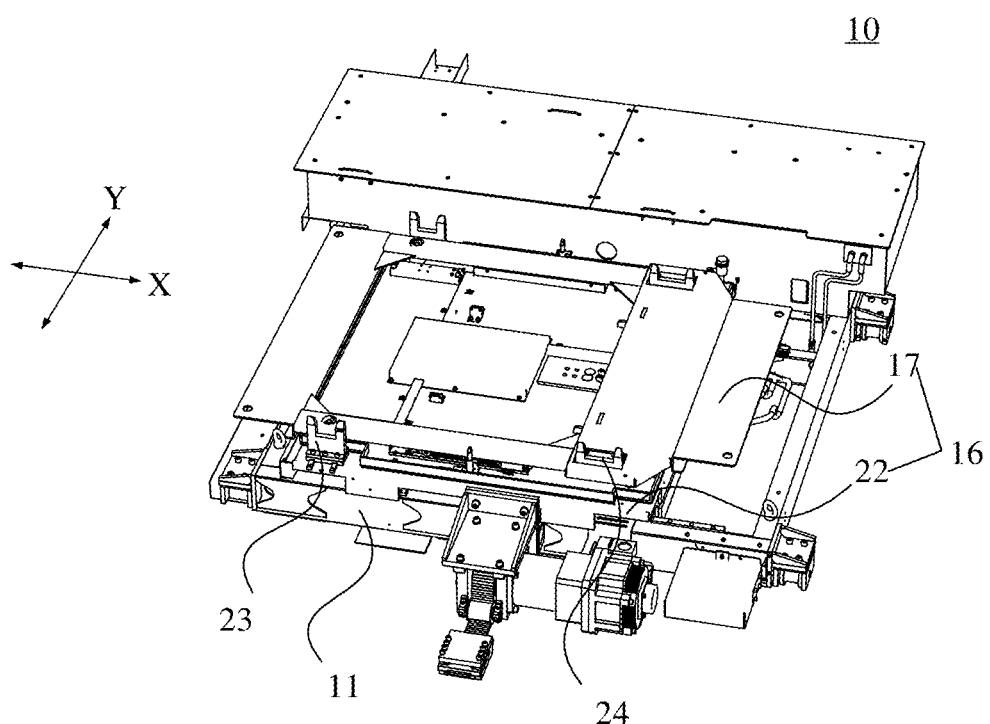
FIG. 1 is a perspective view schematically illustrating of three dimensional structure of the battery replacement device according to Embodiment 1 of the present invention.

Battery replacement device 10; chassis 11; lifting mechanism 12; first support arm 13; second support arm 14; lifting drive unit 15; mounting platform 16; tray 17; carrying layer 18; through hole 181; spring 20; connection layer 21; insertion slot 211; base plate 22; first guide fork 23; second guide fork 24; first guide rail 25; second guide rail 26; first direction X; second direction Y; first driver 31; second driver 32.

Embodiment 2

Battery replacement device 10; chassis 11; lifting mechanism 12; first support arm 13; second support arm 14; lifting drive unit 15; mounting platform 16; tray 17; carrying layer 18; third guide fork 19; spring 20; connection layer 21; base plate 22; first guide fork 23; second guide fork 24; first guide rail 25; first direction X; second direction Y; first driver 31.

DETAILED DESCRIPTION OF THE PREFERRED EMBODIMENT

Embodiment 1

Figure 2:
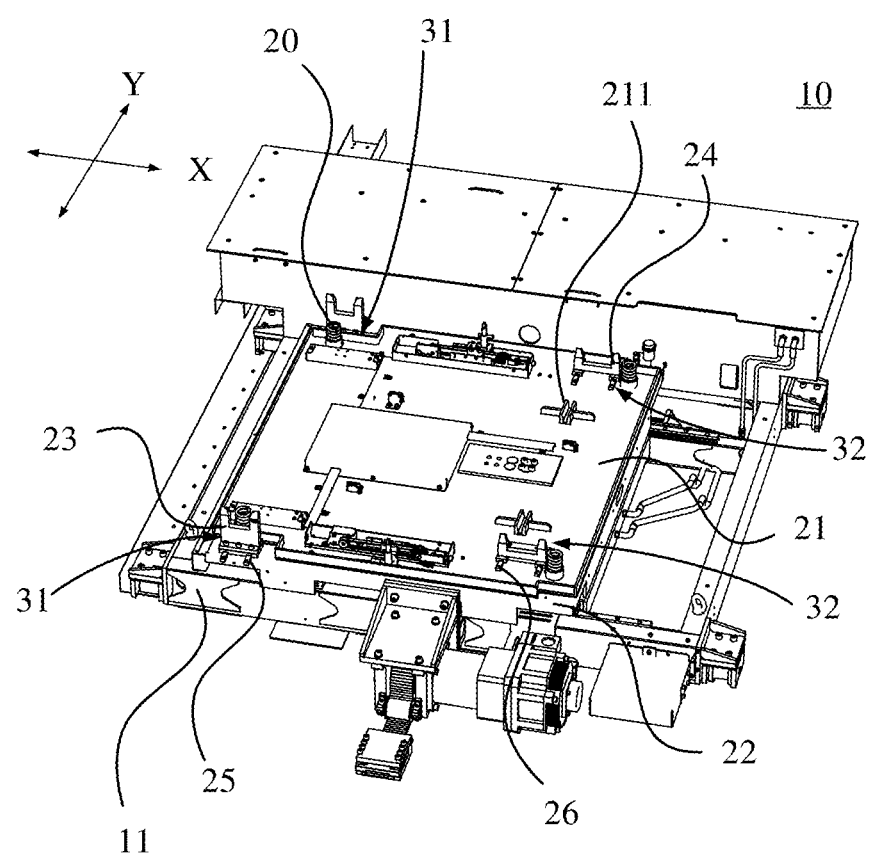
FIG. 2 is a perspective view schematically illustrating of a partial three dimensional structure of the battery replacement device according to Embodiment 1 of the present invention, in which the carrying layer is removed.

FIG. 1 and FIG. 2 show the battery replacement device of the present embodiment. The battery replacement device 10 comprises a lifting mechanism and a mounting platform 16, and the lifting mechanism is used for lifting a base plate 22.

Figure 3:
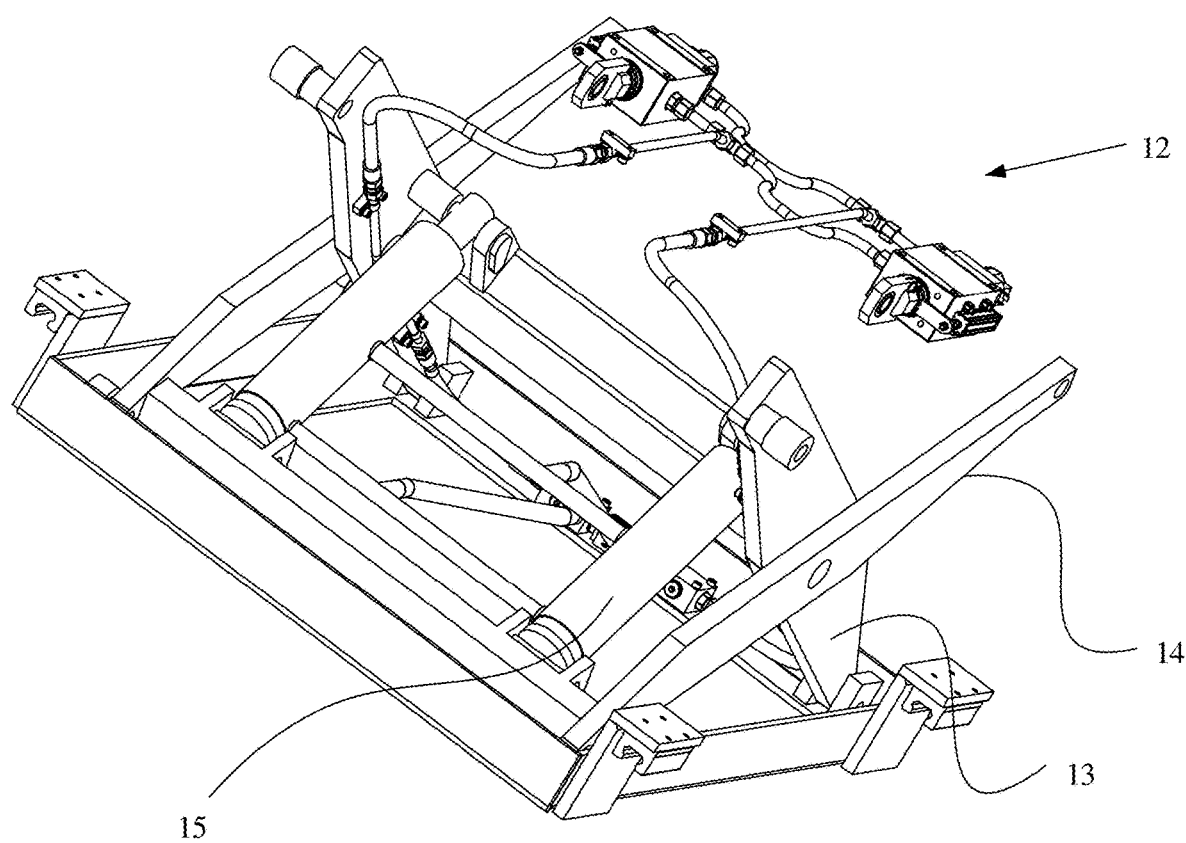
FIG. 3 is a perspective structural view schematically illustrating of the lifting mechanism according to Embodiment 1 of the present invention.

The lifting mechanism 12 is generally a scissor support structure, as shown in FIG. 3, the scissor support structure connects a chassis 11 and a base plate 22, the scissor support structure includes a first support arm 13 and a second support arm 14 that are crossed, one end of the first support arm 13 is slidably hinged to the base plate 22, and the other end of the first support arm 13 is fixedly hinged to the chassis 11, one end of the second support arm 14 is fixedly hinged to the base plate 22, and the other end of the second support arm 14 is slidably hinged to the baseboard, the lifting drive unit 15 is connected to the first support arm 13 and drives the first support arm 13 to rotate around the hinge point between the first support arm 13 and the chassis 11.

The "slidably hinged" means that the hinge point can slide, and in this embodiment it is horizontally slid. The "fixedly hinged" means that the hinge point is fixed and unmovable.

The first support arm 13 and the second support arm 14 are not hinged or connected to each other. The lifting drive unit 15 can extend and contract to make the first support arm 13 to rotate, thereby lifting the base plate 22.

The lifting drive unit 15 is preferably a hydraulic drive device.

Optionally, the lifting mechanism 12 can also adopt a mechanical structure capable of lifting, such as a screw nut transmission structure or a direct hydraulic jacking structure.

The mounting platform 16 comprises: a tray 17 and a base plate 22.

The tray 17 is used for carrying a battery. The battery pack lacking of electricity to be removed from the vehicle, such as an electric vehicle, and the battery pack full of electricity to be installed on the electric vehicle are placed on the tray 17 for transportation and installation.

The tray 17 is provided on the base plate 22 and can move horizontally in a first direction relative to the base plate 22.

The base plate 22 and the tray 17 can be connected through driving devices such as a linear motor, a screw nut transmission structure and other driving devices, so as to implement the movement of the tray 17 relative to the base plate 22.

Both sides of the base plate 22 are provided with a first guide fork 23, and the first guide fork 23 can move horizontally in a second direction perpendicular to the first direction.

Both side of the base plate 22 are provided with an extending first guide rail 25, the first guide fork 23 is slidably provided on the first guide rail 25.

A first driver 31 is provided on the base plate 22, the first driver 31 is used for driving the first guide fork 23 to slide on the first guide rail 25.

The first driver 31 is any one of a pulley driver, a screw nut driver, and a linear motor.

The first guide fork 23 is used for engaging with the lock base on the quick replacement bracket of the vehicle.

Through the movement of the two first guide forks 23 in the second direction, the distance between the two first guide forks 23 is adjusted to adapt to the size of the battery pack loaded on the mounting platform 16.

Both sides (in this embodiment, it is the side area of the upper surface of the tray 17, in other embodiment, it may also be the side surface of the tray 17) of the tray 17 are provided with the second guide fork 24, and the second guide fork 24 can move horizontally in the second direction.

A second guide rail 26 is provided on the upper surface of the tray 17, the second guide fork 24 is slidably provided on the second guide rail 26.

A second driver 32 is provided on the tray 17, the second driver 32 is used for driving the second guide fork 24 to slide on the second guide rail 26.

The second driver 32 is any one of a pulley driver, a screw nut driver, and a linear motor.

The second guide fork 24 is used for engaging with the positioning block on battery pack.

Through the movement of the two second guide forks 24 in the second direction, the distance between the two second guide forks 24 is adjusted to adapt to the size of the battery pack loaded on the mounting platform 16.

The tray 17 comprises a carrying layer 18 and a connection layer 21. The connection layer 21 is provided on the base plate 22 and can move horizontally relative to the base plate 22, the carrying layer 18 is detachably provided above the connection layer 21.

Figure 4:
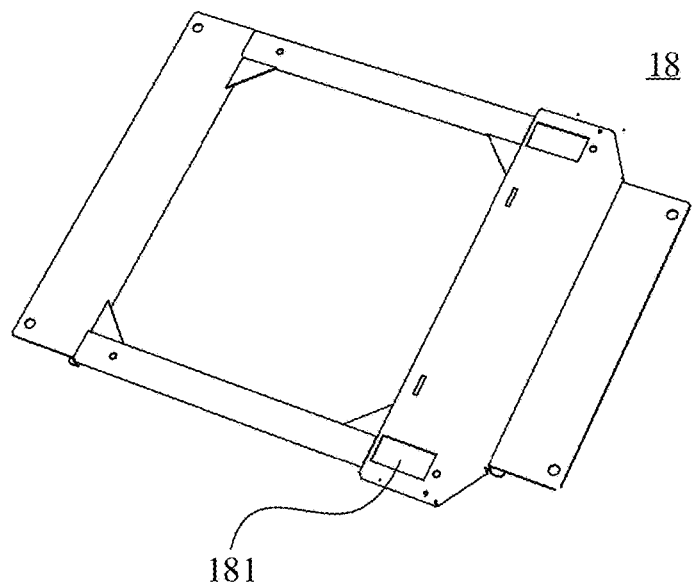
FIG. 4 is a perspective view schematically illustrating of three dimensional structure of the carrying layer according to Embodiment 1 of the present invention.

The second guide rail 26 is provided on the upper surface of the connection layer 21. As shown in FIG. 4, a through hole 181 is provided on the carrying layer 18, the second guide fork 24 can pass the through hole 181 and slide along the second guide rail 26 within the entire length of the second guide rail 26 inside the through hole 181.

The connection layer 21 is also provided with an insertion slot 211, the insertion slot 211 cooperates with the insert part on the lower surface of the carrying layer 18 to define the relative movement of the carrying layer 18 and the connection layer 21 in the first direction. Assembling the carrying layer 18 and the connection layer 21 in this way facilitates the disassembly of the carrying layer 18 and the connection layer 21.

An elastic part is provided between the carrying layer 18 and the connection layer 21, which can buffer the carrying layer 18, and place damage to the battery pack placed on the carrying layer 18, and can also adjust the positioning error in the vertical direction, and it is convenient for the positioning of the battery pack during installation and disassembly. The elastic part is preferably a spring 20.

Optionally, the carrying layer 18 and the connection layer 21 can also be fixedly connected, that is, the layer 18 and the connection layer 21 are not removable. The second guide rail 26 can be directly laid on the upper surface of the carrying layer 18.

In order to increase the adaptability of the mounting platform 16, it is optional to lengthen the length in the second direction of the portion of the mounting platform 16 where the second guide rail 26 is arranged to facilitate the laying of a longer second guide rail 26 or to lay the second guide rail 26 closer to the sides, so as to increase the adjustable range of the distance between the second guide forks 24 so that it can adapt to a wider variety of batteries.

Optionally, the first guide fork may also be provided on only one side of the base plate, correspondingly, an extending first guide rail is provided on only one side of the base plate, and a third guide fork is provided on the other side of the base plate. By moving the first guide fork on one side in the second direction, the distance between the first guide fork and the third guide fork is adjusted to adapt to the size of the battery pack loaded on the mounting platform.

Optionally, the second guide fork may also be provided on only one side of the tray, correspondingly, the second guide rail is provided on only one side of the tray, and a third guide fork is provided on the other side of the base plate. By moving the second guide fork on one side in the second direction, the distance between the second guide fork and the third guide fork is adjusted to adapt to the size of the battery pack loaded on the mounting platform.

As it is known in prior art, the length and width of different models of battery packs will be different, and different models of electric vehicles may be equipped with different models of battery packs. If different battery replacement device is equipped for each model, the cost of battery replacement station will be greatly increased, the mounting platform and the battery replacement device including the same can fit various models of vehicle battery packs by providing the first guide fork and the second guide fork which can move in the second direction, thereby achieving universality of a battery replacement station.

This embodiment illustrates the battery replacement device 10 that includes the mounting platform 16, but the above mounting platform 16 is not limited to this, the mounting platform 16 can also be applied to other devices for battery pack replacement or transportation other than the battery replacement device 10 illustrated in the present embodiment, thereby achieving universality of a battery replacement station.

Figure 5:
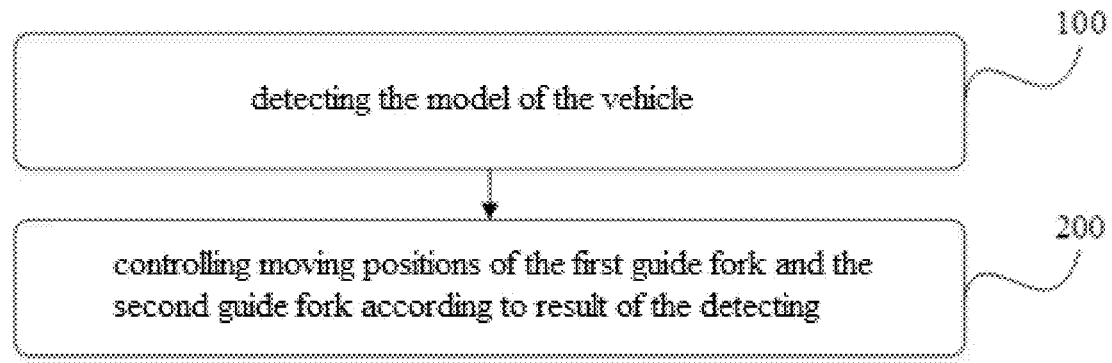
FIG. 5 is a flowchart schematically illustrating of the control method according to Embodiment 1 of the present invention.

FIG. 5 shows the control method of the embodiment according to the present invention, the control method is used for controlling the above mounting platform 16.

The control method includes the following steps:

Step 100: detecting the model of the vehicle.

The detection can be manual, that is, the vehicle model can be recognized by human eyes.

It can also be automatic machine identification, such as, setting a monitoring equipment at the vehicle entrance of the battery replacement station using the mounting platform 16 to recognize the vehicle model. This vehicle model identification technology has been widely used in prior art, and will not be repeated here.

Step 200: controlling moving positions of the first guide fork 23 and the second guide fork 24 according to result of the detecting.

Different vehicle models correspond to battery packs with different sizes. Find the size of the corresponding battery pack according to the detected model, and then adjust the first guide fork 23 and the second guide fork 24 to a predetermined position so that the distance between the two first guide forks 23 is consistent with the distance between the corresponding vehicle lock base, at the same time, the distance between the two second guide forks 24 corresponds to the width of the battery pack, so that the four guide forks on the mounting platform 16 can accurately adapt to the battery pack, so as to install and remove the battery pack smoothly.

If the detecting in step 100 is manually performed, the movement of the first guide fork 23 and the second guide fork 24 is manually controlled.

If the detecting in step 100 is automatically performed by a machine, the data of the monitoring device is received by a control unit, and then a command is sent to the first driver 31 by the control unit to automatically adjust the moving positions of the first guide fork 23 and the second guide fork 24. The control unit can be the control device of t battery replacement station that uses the mounting platform 16, or the device with signal transmission and program processing functions separately arranged on the mounting platform 16, or the like.

Embodiment 2

Figure 6:
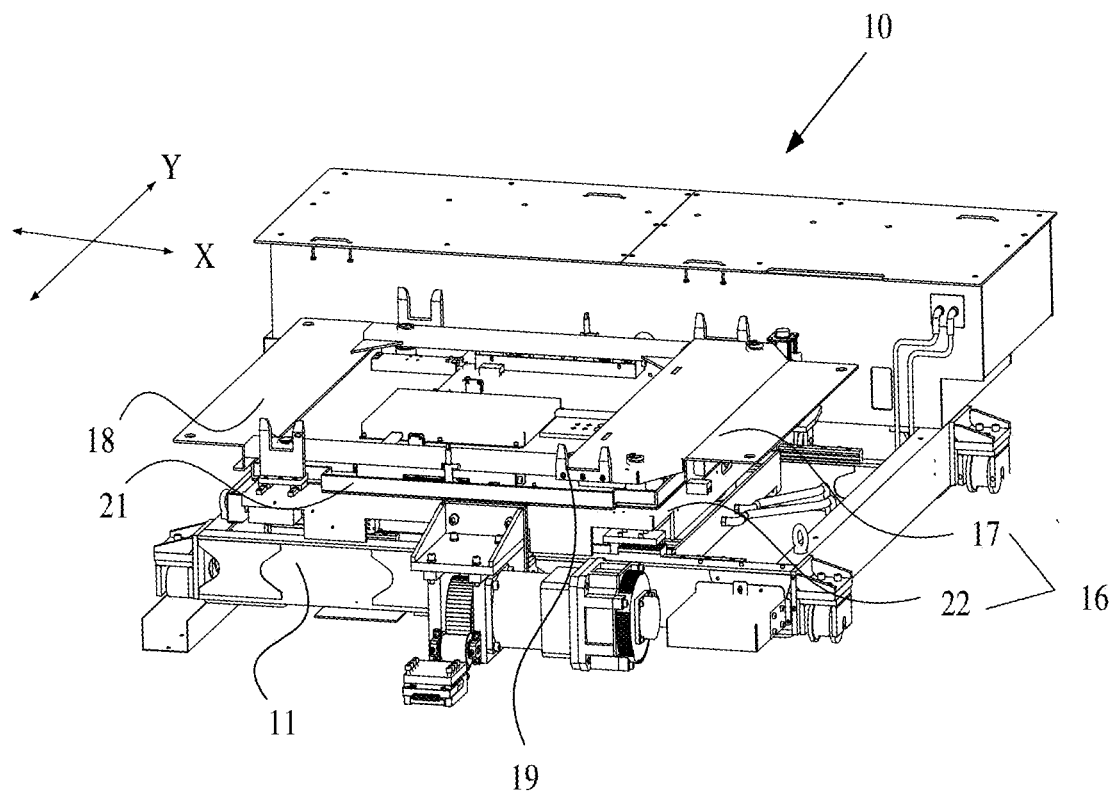
FIG. 6 is a perspective structural view schematically illustrating of the battery replacement device according to Embodiment 2 of the present invention.
Figure 7:
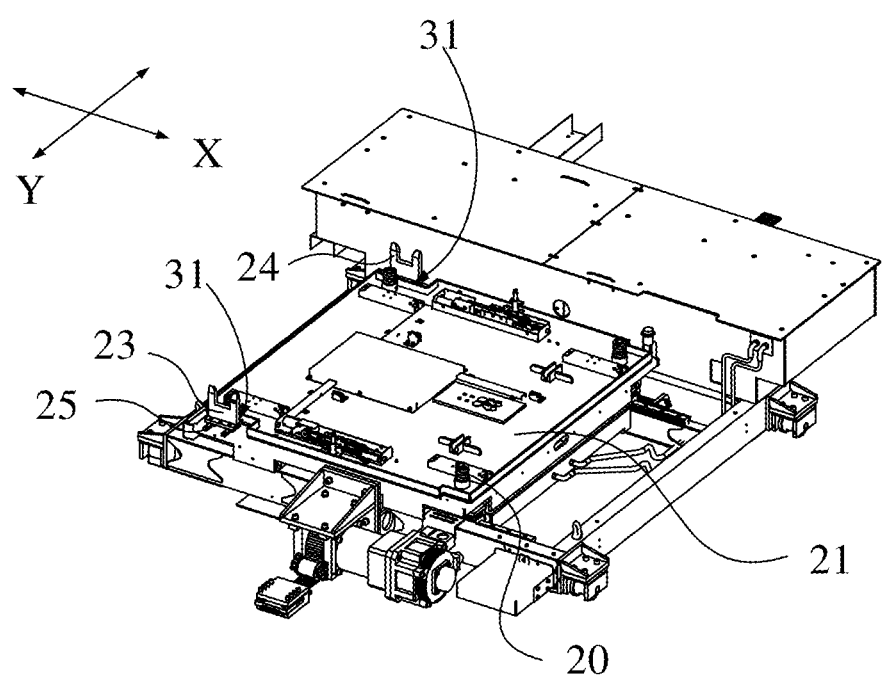
FIG. 7 is a perspective view schematically illustrating of a partial three dimensional structure of the battery replacement device according to Embodiment 2 of the present invention, in which the carrying layer is removed.

FIG. 6 and FIG. 7 show a battery replacement device 10 of a preferred embodiment according to the present invention. The battery replacement device 10 comprises a lifting mechanism 12 and a mounting platform 16, the lifting mechanism 12 is used for lifting a base plate 22.

Figure 8:
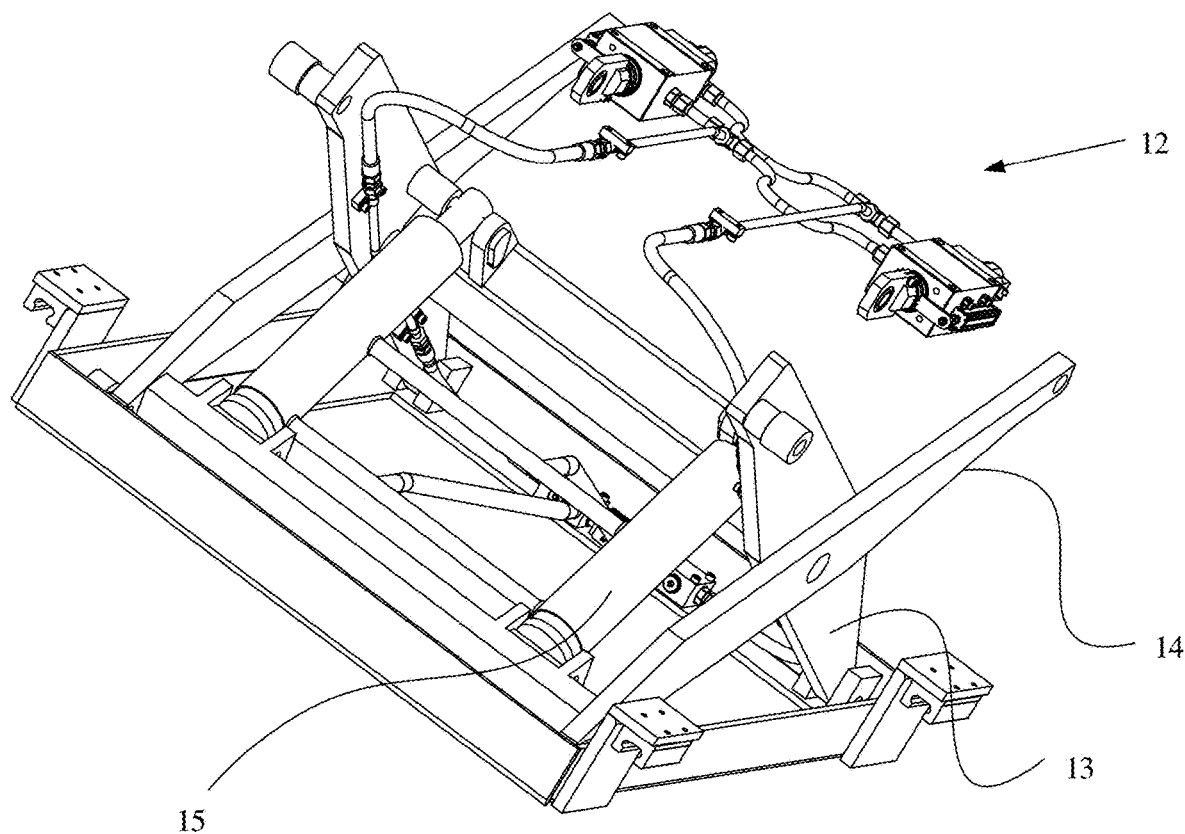
FIG. 8 is a perspective view schematically illustrating of the lifting mechanism according to Embodiment 2 of the present invention.

Lifting mechanism 12 is generally a scissor support structure, as shown in FIG. 8, the scissor support structure connects a chassis 11 and a base plate 22, the scissor support structure comprises a first support arm 13 and a second support arm 14 that are crossed, one end of the first support arm 13 is slidably hinged to the base plate 22, and the other end of the first support arm 13 is fixedly hinged to the chassis 11, one end of the second support arm 14 is fixedly hinged to the base plate 22, and the other end of the second support arm 14 is slidably hinged to the baseboard, the lifting drive unit 15 is connected to the first support arm 13 and drives the first support arm 13 to rotate around the hinge point between the first support arm 13 and the chassis 11.

The "slidably hinged" means that the hinge point can slide, and in this embodiment it is horizontally slid. The "fixedly hinged" means that the hinge point is fixed and unmovable.

The first support arm 13 and the second support arm 14 are not hinged or connected to each other. The lifting drive unit 15 can extend and contract to make the first support arm 13 to rotate, thereby lifting the base plate 22.

The lifting drive unit 15 is preferably a hydraulic drive device.

Optionally, the lifting mechanism 12 can also adopt a mechanical structure capable of lifting, such as a screw nut transmission structure or a direct hydraulic jacking structure.

The mounting platform 16 comprises: a tray 17 and a base plate 22.

The tray 17 is used for carrying a battery. The battery pack lacking of electricity to be removed from the vehicle, such as an electric vehicle and the battery pack full of electricity to be installed on the electric vehicle are placed on the tray 17 for transportation and installation.

The tray 17 is provided on the base plate 22 and can move horizontally in a first direction X relative to the base plate 22.

The base plate 22 and the tray 17 can be connected through driving devices such as a linear motor, a screw nut transmission structure and other driving devices, so as to implement the movement of the tray 17 relative to the base plate 22.

A first guide fork 23 is provided on one side of the base plate 22, and the first guide fork 23 can move horizontally in a second direction Y perpendicular to the first direction X.

An extending first guide rail 25 is provided on one side of the base plate 22, the first guide fork 23 is slidably provided on the first guide rail 25.

A first driver 31 is provided on the base plate 22, the first driver 31 is used for driving the first guide fork 23 to slide on the first guide rail 25.

The first driver 31 is any one of a pulley driver, a screw nut driver, and a linear motor.

A second guide fork 24 that is arranged at the position corresponding to the first guide fork 23 is provided on another side of the base plate 22, the second guide fork 24 is fixed to the base plate 22 and cannot be moved. The first guide fork 23 and the second guide fork 24 are used for engaging with the lock base on the quick replacement bracket of the vehicle.

Through the movement of the first guide forks 23 in the second direction Y, the distance between the first guide forks 23 and the second guide fork 24 in the second direction Y is adjusted to adapt to the size of the battery pack loaded on the mounting platform 16. The tray 17 comprises a carrying layer 18 and a connection layer 21. The connection layer 21 is provided on the base plate 22 and can move horizontally relative to the base plate 22, the carrying layer 18 is detachably provided on the connection layer 21, and a third guide fork 19 is provide on the carrying layer 18. The third guide fork 19 is used for engaging with the positioning block on battery pack.

As shown in FIG. 7, an elastic part is provided on the connection layer 21, the carrying layer 18 is placed on the elastic part.

The elastic part is provided between the carrying layer 18 and the connection layer 21, which can buffer the carrying layer 18 and prevent damage to the battery pack prevent the carrying layer 18, and can also adjust the positioning error in the vertical direction, and it is convenient for the positioning of the battery pack during installation and disassembly.

The elastic part is preferably a spring 20.

As it is known in prior art, the length and width of different models of battery packs will be different, and different models of electric vehicles may be equipped with different models of battery packs. If different battery replacement device 10 is equipped for each model, the cost of battery replacement station will be greatly increased, the mounting platform 16 and the battery replacement device 10 including the same can fit various models of vehicle battery packs by providing the first guide fork 23, which can move in the second direction Y and the replaceable carrying layer 18, thereby achieving universality of a battery replacement station.

This embodiment illustrates the battery replacement device 10 that includes the mounting platform 16, but the above mounting platform 16 is not limited to this, the mounting platform 16 can also be applied to other devices for battery pack replacement or transportation other than the battery replacement device 10 illustrated in the present embodiment, thereby achieving universality of a battery replacement station.

Figure 9:
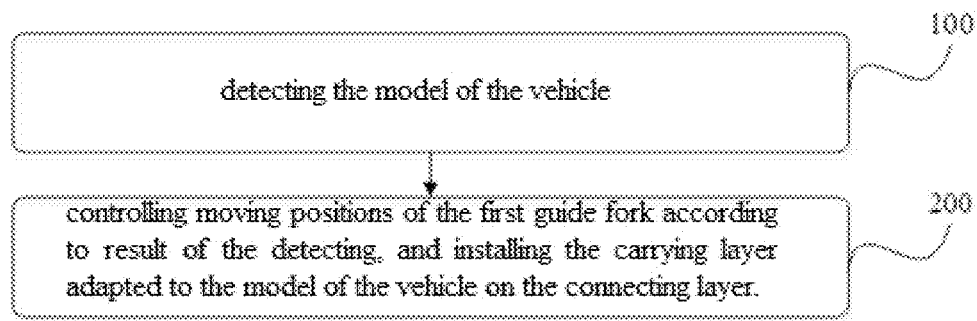
FIG. 9 is a flowchart illustrating of the control method according to Embodiment 2 of the present invention.

FIG. 9 shows the control method of embodiment according to the present invention, the control method is used for controlling the above mounting platform 16.

The control method includes the following steps:

Step 100: detecting the model of the vehicle.

The detection can be manual, that is, the vehicle model can be recognized by human eyes.

It can also be automatic machine identification, such as, setting a monitoring equipment at the vehicle entrance of the battery replacement station using the mounting platform 16 to recognize the vehicle model. This vehicle model identification technology has been widely used in prior art, and will not be repeated here.

Step 200: controlling moving positions of the first guide fork 23 according to result of the detecting, and installing the carrying layer 18 adapted to the model of the vehicle on the connection layer 21.

Different vehicle models correspond to battery packs with different sizes. Find the size of the corresponding battery pack according to the detected model, and then adjust the first guide fork 23 to a predetermined position so that the distance between the first guide forks 23 and the second guide fork 24 corresponds to the width of the battery pack, the carrying layer 18 corresponds to the width of the battery pack, and the distance between the fixed forks on the carrying layer corresponds to the width of the battery pack of this model, so that the four guide forks on the mounting platform 16 can accurately adapt to the battery pack, so as to install and remove the battery pack smoothly.

If the detection in step 100 is manually operated, the movement of the first guide fork 23 is manually controlled, and the carrying layer 18 is manually selected.

If the detection in step 100 is automatically operated by a machine, the data of the monitoring device is received by a control unit, and then a command is sent to the first driver 31 by the control unit to automatically adjust the moving positions of the first guide fork 23. The control unit can be the control device of t battery replacement station that uses the mounting platform 16, or the device with signal transmission and program processing functions separately arranged on the mounting platform 16, or the like.

In the description of the invention, it should be understood that the azimuth or positional relationship indicated by the terms "up", "down", "front", "back", "left", "right", "vertical", "horizontal", "top", "bottom", "inside", "outside" is based on the azimuth or positional relationship shown in the attached drawings, it is only for the convenience of describing the invention and simplifying the description, rather than instructions referred to in or implied devices or components must have a specific location, in a specific orientation structure and operation, therefore cannot be interpreted as limiting the invention, unless otherwise stated herein.

Although the specific embodiments of the present invention are described above, those skilled in the art should understand that these are only an example, and the protection scope of the present invention is defined by the appended claims. Those skilled in the art can make various amendments or modifications to these embodiments without departing from the principle and essence of the present invention, but these amendments and modifications all fall within the protection scope of the present invention.

What is claimed is:

1. A mounting platform, applied to a battery replacement device for replacing a battery in a vehicle, where the vehicle includes a quick replacement bracket with a lock base, and the battery includes a positioning block, wherein the mounting platform comprises: a tray and a base plate;
   the tray is configured for carrying a battery;
   the tray is provided on the base plate and adapted to move horizontally in a first direction relative to the base plate;
   a first guide fork is provided on one side of the base plate, configured for engaging with the lock base on the quick replacement bracket of the vehicle, and the first guide fork is adapted to move horizontally in a second direction perpendicular to the first direction relative to the base plate;
   wherein, the tray comprises a carrying layer and a connection layer, the connection layer is configured to position the tray on the base plate and to move horizontally relative to the base plate, the carrying layer is detachably provided on the connection layer, and a third guide fork is fixedly provided on the carrying layer, and configured for engaging with the positioning block on the battery.

2. The mounting platform according to claim 1, wherein an extending first guide rail is provided on one side of the base plate, and the first guide fork is slidably provided on the first guide rail.

3. The mounting platform according to claim 2, wherein a first driver is provided on the base plate, the first driver is configured for driving the first guide fork to slide on the first guide rail.

4. The mounting platform according to claim 3, wherein the first driver is any one of a pulley driver, a screw nut driver, and a linear motor.

5. The mounting platform according to claim 1, wherein an elastic part is provided on the connection layer, and the carrying layer is placed on the elastic part.

6. The mounting platform according to claim 5, wherein the elastic part is a spring.

7. A battery replacement device, wherein the battery replacement device comprises a lifting mechanism and the mounting platform according to claim 1, wherein the lifting mechanism is configured for lifting the base plate.

\* \* \* \* \*